United States Patent [19]
Schmidt

[11] Patent Number: 4,970,945
[45] Date of Patent: Nov. 20, 1990

[54] ACTUATING PISTON ASSEMBLY, AND SEAL THEREFOR, FOR TORQUE TRANSMITTING SYSTEMS

[75] Inventor: Michael R. Schmidt, Carmel, Ind.

[73] Assignee: General Motors Corporation, Detroit, Mich.

[21] Appl. No.: 344,781

[22] Filed: Apr. 28, 1989

[51] Int. Cl.$^5$ .............................................. F01B 31/00
[52] U.S. Cl. .................................. 92/107; 92/254; 277/152; 277/181; 277/189; 192/85 AA
[58] Field of Search ............... 192/85 AA, 85 CA; 277/152, 181, 189, 201; 92/107, 247, 241, 254

[56] References Cited

U.S. PATENT DOCUMENTS

| | | | |
|---|---|---|---|
| 2,218,616 | 10/1940 | McCune et al. | 92/107 |
| 2,332,585 | 10/1943 | McCune | 92/107 |
| 2,428,452 | 10/1947 | Farmer | 92/107 |
| 2,702,618 | 2/1955 | Baker et al. | 192/85 AA |
| 2,779,645 | 1/1957 | Hogan | 277/188 R X |
| 2,977,143 | 3/1961 | Talamonti | 277/152 |
| 3,596,537 | 8/1971 | Koivunen | 192/85 AA X |
| 3,814,226 | 6/1974 | White | 192/85 AA |
| 3,881,584 | 5/1975 | Marsch | 192/85 AA |
| 3,938,427 | 2/1976 | Warrington | 92/107 |
| 4,034,834 | 7/1977 | Starling | 192/85 AA |
| 4,298,203 | 11/1981 | Holzer et al. | 277/189 X |
| 4,635,778 | 1/1987 | Lederman | 192/85 AA |
| 4,648,495 | 3/1987 | Vater et al. | 192/85 AA X |
| 4,821,627 | 4/1989 | Leigh-Monstevens | 277/206 A X |
| 4,827,834 | 5/1989 | Leigh-Monstevens | 277/206 A X |
| 4,881,628 | 11/1989 | Yamaguchi | 192/85 AA |
| 4,917,002 | 4/1990 | Pociask | 277/189 X |

FOREIGN PATENT DOCUMENTS

| | | | |
|---|---|---|---|
| 2137289 | 10/1984 | United Kingdom | 277/152 |

*Primary Examiner*—Edward K. Look
*Assistant Examiner*—John E. Ryznic
*Attorney, Agent, or Firm*—Donald F. Scherer

[57] ABSTRACT

An actuating piston assembly (10, 110) for a torque transmitting device (11). The actuating piston assembly (10, 110) has a seal subassembly (35, 135) with a supporting annulus (36, 136) and a seal member (38, 138). The seal member (38, 138) is preferably bonded to the supporting annulus (36, 136). A generally radially oriented first wiping lip (55, 155) extends outwardly with respect to said seal subassembly (35, 135), and a generally radially oriented second wiping lip (56, 156) extends inwardly with respect to said seal subassembly (35, 135). A plurality of circumferentially spaced bores (41, 141) penetrate the supporting annulus (36, 136) and the seal member (38, 138). A plurality of dowel-like connecting rods (42, 142) are presented from at least selected bores (41 and 58 or 141 and 158).

6 Claims, 1 Drawing Sheet

ACTUATING PISTON ASSEMBLY, AND SEAL THEREFOR, FOR TORQUE TRANSMITTING SYSTEMS

TECHNICAL FIELD

The present invention relates generally to brakes and/or clutches for use in conjunction with torque transmitting systems. More particularly, the present invention relates to piston assemblies for actuating the brakes and/or clutches employed in torque transmitting systems. Specifically, the present invention relates to a novel and unique seal arrangement that is integrally incorporated in the brake and/or clutch actuating piston assembly incorporated in torque transmitting systems.

BACKGROUND OF THE INVENTION

Torque transmitting systems are widely employed in automobile transmissions selectively to control relative rotation between components of the transmission. As is well known to the art, one widely accepted form of an automatic, vehicular transmission employs compound planetary gear sets that utilize three clutch assemblies and two braking bands to determine relative rotation between selected components in order to obtain the desired function of the compound planetary gear sets. The operator selects the driving range from the neutral, forward (either the standard drive, the "Intermediate" or the "Lo" forward selections) or reverse, and the transmission automatically changes gear ratios in relation to the vehicle speed and the engine torque input, as permitted within the driving range selected. Vehicle speed and engine torque signals are constantly fed to the transmission in a manner well known to the art in order to provide the proper gear ratio for maximum efficiency and performance at all throttle openings.

A planetary gear train consists of a center, or sun, gear, an internal gear and a planetary carrier assembly which includes and supports the smaller planet gears, or pinions. When the sun gear is held stationary and power is applied to the internal gear, the planetary gears rotate in response to the power applied to the internal gear and thus "walk" circumferentially about the fixed sun gear to effect rotation of the carrier assembly in the same direction as the direction in which the internal gear is being rotated.

When any two members of the planetary gear train rotate in the same direction and at the same speed, the third member is forced to turn at the same speed. For example, when the sun gear and the internal gear rotate in the same direction, and at the same speed, the planet gears do not rotate about their own axes but rather act as wedges to lock the entire unit together to effect what is known as direct drive.

Whenever the carrier assembly is restrained from spinning freely, and power is applied to either the sun gear or the internal gear, the planet gears act as idlers. In that way the driven member is rotated in the opposite direction as the drive member. Thus, when the reverse drive range is selected, a brake band assembly is actuated frictionally to engage the carrier assembly, and restrain it against rotation, so that torque applied to the sun gear will turn the internal gear in the opposite direction in order to reverse the rotational direction of the drive wheels, and thereby reverse the direction of the vehicle itself. The friction band assemblies are normally operated by servo mechanisms, many varieties of which are known to the art, but the present invention does not relate servo mechanisms, and they will not be further described herein.

It should be appreciated that a second friction applying band assembly may also be employed when the engine compression, acting through the transmission, is being employed to effect a braking action. To understand this operation it is desirable to know that in a compound planetary gear set, multiple planetary gear sets may be employed, and adjacent planetary gear sets may utilize sun gears fabricated in one piece. A sprag assembly is frequently employed selectively to preclude the common sun gears from rotating in one direction.

When multiple planetary gear sets are employed, adjacent planetary gear sets are generally connected. Typically, the carrier of the first set is secured to the internal gear of the second set. To make the two planetary gear sets effective, a roller clutch assembly is generally employed to hold the carrier of the second set against rotation in at least one direction.

To provide a means for connecting and disconnecting the power output of a torque converter to the transmission gear train, a clutch assembly is generally employed. Normally, the clutch assembly includes a clutch housing which is splined to the input shaft. A series of torque plates are connected, as by tangs, to the clutch housing, and a second series of torque plates are connected, also by tangs, to a clutch hub member. An actuating piston is hydraulically operated frictionally to lock the torque plates together, and a release spring is employed to retract the piston when the hydraulic pressure is released. By effecting a spline connection between the main transmission shaft and the clutch hub member, whenever hydraulic pressure is supplied to the clutch assembly the input shaft directly rotates the main transmission shaft. When the hydraulic pressure is released, the clutch assembly disengages the aforesaid drive connection, and the transmission is in neutral.

A similar clutch arrangement may also be employed selectively to connect the outer race of the sprag to the transmission housing. When the outer race of the sprag is so connected to the housing, the sprag is effective in securing the sun gear connected to the sprag against rotation, and the power output from the converter is received by the transmission output shaft at the gear reduction ratio associated with "second" gear.

A third such clutch arrangement is employed to lock the pinions of the adjacent planetary gear set together so that they act as wedges to allow the two adjacent planetary gear sets to rotate as one unit. In this arrangement the power output from the converter is received by the transmission output shaft in what is designated as "third" gear.

Actuation of the first and third described clutch arrangements is generally effected when the operator selects the "reverse" range of operation.

Accordingly, it is apparent that the piston assemblies which actuate the aforesaid clutch arrangements are of significant importance to the operation of such a transmission. However, unless expensive and time consuming machining operations have been employed in making both the piston chamber and the piston itself, considerable problems have been encountered by the use of individual seals which have either been independently mounted on the piston itself or in recesses provided in the wall of the chamber in which the piston reciprocates.

In an attempt to reduce the expense required to provide a satisfactory seal between the actuating piston and the piston chamber, considerable attempts have been made to bond the seals directly to the piston, but the resulting one piece piston and seal assemblies have also had significant problems.

For example, a bonding agent has generally been employed to effect adhesion between the piston and the seal in an attempt to maintain the seal in its proper disposition relative not only to the piston but also the piston chamber. However, such bonding agents generally require a rather high temperature to be activated. For that reason the mass of the metallic piston in relation to the mass of the seal becomes significant. Specifically, the considerably greater mass of the piston requires additional time and energy to raise the temperature of the composite assembly to the temperature required to activate the bonding agent.

Attempts to reduce the mass of the piston relative to the mass of the seal have heretofore severely impaired the structural support necessary to assure that the seal remains fully operable. Experience reveals that unless the seal is sufficiently supported across the gap between the piston and the piston chamber, a surge of the pressure within the piston chamber can "blow by" the seal and destroy the effectiveness of the actuating piston assembly.

SUMMARY OF THE INVENTION

It is, therefore, a primary object of the present invention to provide an improved actuating piston assembly that will permit a significant reduction in the complexity thereof and yet fully effect the required seal between the piston assembly and the piston chamber within which the piston assembly reciprocates.

It is a another object of the present invention to provide an improved actuating piston assembly, as above, which will permit a direct bond between the seal member and a supporting annulus to which the other components of the piston assembly can also be mounted.

It is a further object of the present invention to provide an improved actuating piston assembly, as above, wherein the supporting annulus has a minimal mass in relation to the mass of the seal member so that the seal member can be molded upon, and bonded to, the supporting annulus at reduced time and energy related costs.

It is still another object of the present invention to provide an improved actuating piston assembly, as above, which provides fully adequate support to the seal member.

It is yet another object of the present invention to provide an improved actuating piston assembly, as above, which permits the various components of the piston assembly to be readily and effectively assembled to the supporting annulus after the seal member has been bonded thereto.

It is yet a further important object of the present invention to provide an improved actuating piston assembly, as above, wherein the various components assembled to the seal subassembly include connecting rods which serve multiple functions and which can be accurately fabricated and assemble without the need to be bonded to the seal member.

These and other objects of the invention, as well as the advantages thereof over existing and prior art forms, which will be apparent in view of the following detailed specification, are accomplished by means hereinafter described and claimed.

In general, an actuating piston assembly embodying the concepts of the present invention is particularly adapted for use in conjunction with a torque transmitting system.

The actuating piston assembly has a seal subassembly which includes a supporting annulus and a seal member. The seal member is preferably bonded to the supporting annulus. A generally radially oriented first wiping lip extends outwardly with respect to said seal subassembly, and a generally radially oriented second wiping lip extends inwardly with respect to the seal subassembly. A plurality of circumferentially spaced bores penetrate the supporting annulus and the seal member. A plurality of dowel-like connecting rods are presented from at least selected bores.

One exemplary embodiment of an actuating piston assembly particularly adapted for use in conjunction with a torque transmitting system, and one alternative construction thereof, are deemed sufficient to effect a full disclosure of the subject invention are shown by way of example in the accompanying drawings and are described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
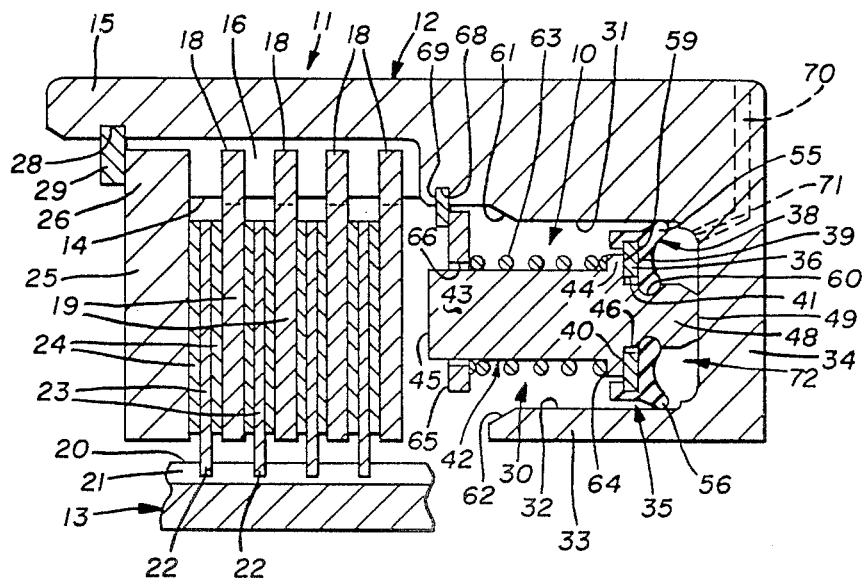
FIG. 1 is a cross section through an appropriate portion of a torque transmitting system which employs an actuating piston assembly that incorporates a novel and unique seal arrangement embodying the concepts of the present invention, the components of the piston assembly being depicted to permit relative rotation between the friction disks in the torque transmitting system.
Figure 2:
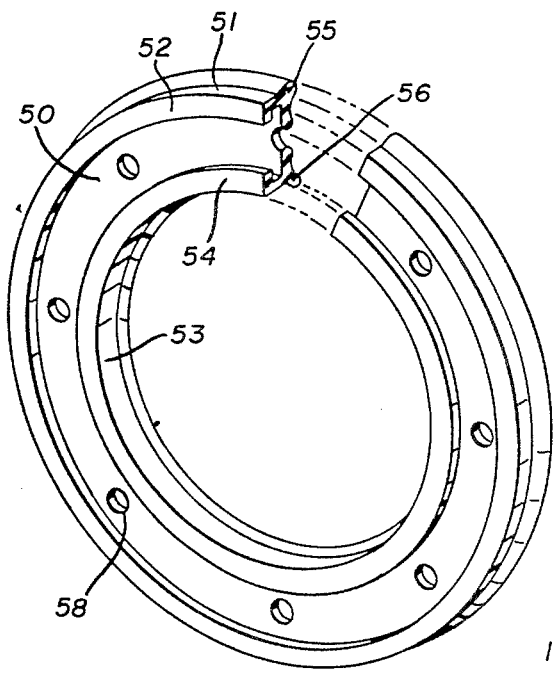
FIG. 2 is a perspective view depicting one configuration for a seal that can be employed in a torque transmitting system embodying the concepts of the present invention; and, FIG. 3 is a slightly enlarged cross sectional view depicting alternative configuration for a seal arrangement embodying the concepts of the present invention.

One representative form of an actuating piston assembly for a torque transmitting system embodying the concepts of the present invention is designated generally by the numeral 10 on the accompanying drawings.

To facilitate the disclosure of the present invention, the actuating piston assembly 10 will be described in conjunction with a torque transmitting system 11 in the nature of a vehicular transmission. As such, the torque transmitting system 11 is interposed between two relatively rotatable members 12 and 13. The member 12 may, for example, comprise an outer housing which may either be rotatable or fixed. The member 13 may comprise an inner hub which is generally rotatable. Whereas at least one of the members 12 or 13 is rotatable, it must be understood that the other member 13 or 12 may be either rotatable or fixed. That is, the actuating piston assembly 10 may be employed either in conjunction with a clutch mechanism or a brake mechanism.

In the example depicted, the radially inner surface 14 on the circumferential outer wall 15 of the housing member 12 may be axially slotted, as at 16, to receive the tangs 18 of a plurality of first, annular torque plates 19 and thereby assure that the first torque plates 19 are not relatively rotatable with respect to the housing member 12, irrespective of whether the housing member 12 is itself rotatable or fixed. To assure that the interaction between the housing member 12 and the tangs is sufficient to withstand the loading to which the tangs will be subjected, a plurality of slots 16 may be employed at circumferentially spaced intervals about the inner surface 14 of the housing wall 15, and each of the first torque plates 19 are provided with a sufficient number of tangs 18 to interact with those slots 16, as is well known to the art.

Similarly, the radially outer surface 20 of the hub member 13 may also be axially slotted, as at 21, at circumferentially spaced intervals about the outer surface 20 to receive the several tangs 22 which extend radially inwardly from each of the plurality of second, annular torque plates 23 and thereby assure that the second torque plates 23 will not rotate relative to the hub member 13, as is also well known to the art.

An annular friction disk 24 is interposed between each successive first and second torque plate 19 and 23. To assure that the several friction disks 24 will not be displaced when they are not compressed between the successive first and second torque plates 19 and 23, each friction disk 24 is preferably secured to one of the torque plates 19 or 23 between which it is sandwiched. As is well known to the art, the friction disks 24 may be bonded to either the first or second torque plates 19 or 23 by a suitable adhesive.

An annular backing plate 25 is also preferably provided with a plurality of tangs 26 which extend radially outwardly therefrom to be received within the axial slots 16 in the circumferential wall 15 of the housing member 12. A recess 28 is incised circumferentially within the radially inner surface 14 on the circumferential wall 15 of the housing member 12 to receive a C-ring 29, or the like, to preclude axial displacement of the backing plate 25 away from the first and second torque plates 19 and 23, respectively, as will hereinafter be more fully discussed.

An annular chamber 30 is recessed into the housing member 12 in opposition to the backing plate 25, with the series of first and second torque plates 19 and 23, respectively, disposed therebetween, as depicted in FIG. 1. The chamber 30 is thus defined by a machined annular surface 31 on the radially inner portion of the housing wall 15, and an opposed, also machined, annular surface 32 on the radially outer portion of a flange 33 which is disposed concentrically inwardly of the housing wall 15. As depicted, the flange 33 may be integrally connected to the housing wall 15 by a radially oriented web wall 34. The actuating piston assembly 10 is operatively received within the annular chamber 30.

The actuating piston assembly 10 has a seal subassembly 35 which includes a preferably metallic, planar, supporting annulus 36 and a seal member 38. The planar supporting annulus 36 thus presents opposite first and second facing surfaces 39 and 40, respectively, and the seal member is preferably bonded to the supporting annulus 36, an exemplary arrangement for which will be hereinafter more fully explained. The other components of the piston assembly 10 may also be preferably mounted from the supporting annulus 36.

The supporting annulus 36 has a plurality of circumferentially spaced bores 41 within which the dowel-like connecting rods 42 of the actuating piston assembly 10 are mounted. Specifically, each connecting rod 42 has a body portion 43 with opposite ends. A radially extending flange circumscribes the body portion 43 at one end thereof to form a shoulder 44, the purpose for which will be hereinafter more fully described. The second end of the body portion 43 constitutes a force applying, engaging surface 45. A neck portion 46 extends axially outwardly from the shoulder 44 in a direction away from the body portion 43 and terminates in a head portion 48. The head portion 48 extends through the appropriate bore 41 in the supporting annulus 36, and terminates in a stop surface 49 which engages the radially oriented web wall 34.

The seal member 38, which was stated as being preferably bonded to the supporting annulus 36, has an annular web wall 50 that is preferably planar to engage, and be bonded to, the first facing surface 39 of the supporting annulus 36. A first, cylindrically annular extension wall 51 extends axially from the radially outer perimeter of the annular web wall 50 and terminates in a first retaining flange 52 which extends radially inwardly from the first, cylindrically annular extension wall 51 to engage the second facing surface 40. A second, cylindrically annular extension wall 53 extends axially from the radially inner boundary of the annular web wall 50 and terminates in a second retaining flange 54 which extends radially outwardly from the second, cylindrically annular extension wall 53 in opposition to the first retaining flange 52 and thereby also engage the second facing surface 40.

A first wiping lip 55 is generally radially oriented and extends outwardly from the seal sub assembly 35. Specifically, the first wiping lip 55 extends obliquely outwardly from the intersection of the web wall 50 and the first, cylindrically annular extension wall 51. A second wiping lip 56 is generally radially oriented and extends inwardly from the seal subassembly 35. Specifically, the second wiping lip 56 extends obliquely inwardly from the intersection of the web wall 50 and the second, cylindrically annular extension wall 53.

A plurality of bores 58 penetrate the web wall 50 of the seal member 38, and each bore 58 aligns with a corresponding bore 41 which penetrates the supporting annulus 36.

At this point it can be appreciated that a seal member 38 of elastomeric material such as rubber or neoprene can be effectively cured with a metallic supporting annulus 36 in situ. Even though the planar, metallic supporting annulus 36 provides the desired full support to the web wall 50 of the seal member 38, and thus extends radially outwardly and inwardly into fairly close proximity to the location of the wiping lips 55 and 56, the mass of the metallic supporting annulus 36 is sufficiently small that its presence will not significantly detract from the time and energy required to effect a cure to the seal member 38. To those familiar with this art it will now be readily appreciated that the combined construction permits the elastomeric material of the seal member 38 to be effectively, and efficiently, molded and cured onto the supporting annulus 36. Moreover, by thus curing the seal member 38 in its mounted position on the supporting annulus 36 bonding between the elastomeric material of the seal member 38 and the metallic material of the supporting annulus 36 can be achieved.

Only after the seal member 36 has been cured need the remaining components of the actuating piston assembly 10 be assembled to the seal subassembly 35.

Specifically, the head portion 48 of each connecting rod 42 will be inserted through the aligned bores 41 and 58 of the supporting annulus 36 and the seal member 38, respectively. When the first side 59 of the shoulder 44 engages the supporting annulus 36 the excess elastomeric material provided around each bore 58 will be received within the annular recess 60 provided in the neck portion 46 of the connecting rod 42.

When all the connecting rods 42 are received in the supporting annulus 36 the actuating piston assembly 10 is completed, and the piston assembly 10 can be operatively inserted into the annular piston chamber 30. To facilitate insertion of the piston assembly 10 a flared surface 61 may be provided on the circumferential outer wall 15 of the housing member 12 which circumscribes the annular surface 31 of the piston chamber 30. Engagement of the first wiping lip 55 with the flared surface 61 will guide the wiping lip 55 into the piston chamber 30. A similar flared surface 62 may be provided on the flange 33 to circumscribe the annular surface 32 of the piston chamber 30 to guide the second wiping lip 56 into the piston chamber 30.

With the wiping lips 55 and 56 thus engaging the surfaces 31 and 32 of the piston chamber 30, respectively, the piston assembly 10 can be gently inserted until the stop surface 49 on the head portion 48 engages the web wall 34 of the housing member 12. A compression spring 63 may then be mounted over the body portion 43 of each connecting rod 42. One end of the compression springs 63 are to engage the second side 64 of the shoulder 44 on each connecting rod 42, and the opposite end of each compression spring 63 will engage an annular reaction plate 65. The planar, reaction plate 65 is also provide with a plurality of bores 66 which are spaced circumferentially about the annular reaction plate 65 to permit the connecting rods 42 to reciprocate freely therethrough.

An annular recess 68 is provided in the surface 14 of the housing wall 15 to receive a retainer ring 69 which maintains the reaction plate 65 against the biasing action of the compression springs 63, thus causing the biasing force of the compression springs 63 to react against he shoulder 44 and drive the stop surface 49 on the connecting rod 42 against the web wall 34 of the housing member 12.

A conduit 70 communicates from a source of fluid pressure (not shown) through the housing wall 15 and the web wall 34 to open through an access aperture 71 into the pressure subchamber 72 of the piston chamber 30 to permit ingress and egress of pressure fluid to and from the pressure subchamber 72.

When sufficient fluid pressure is admitted to the pressure subchamber 72 via conduit 70 the actuating piston assembly 10 drives the engaging surface 45 against the interleaved series of first and second torque plates 19 and 23 until they bottom against the backing plate 25. When the first and second series of torque plates 19 and 23 are thus firmly sandwiched between the backing plate 25 and the engaging surface 45 presented from the actuating piston assembly 10 to preclude relative rotation between the torque plates 19 and 23 and thereby also preclude relative rotation between the housing member 12 and the hub member 13.

Figure 3:
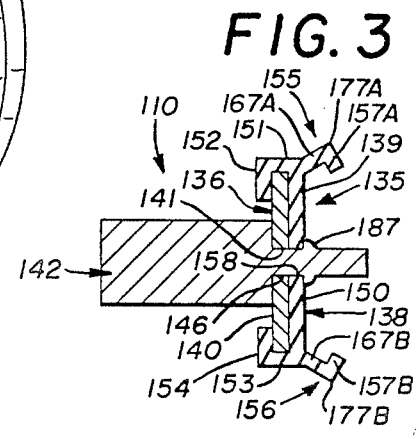

As depicted in FIG. 3, a modestly different seal subassembly 135 also utilizes a seal member 138 which is carried on a supporting annulus 136. The seal member 138 has an annular web wall 150 which may engage, and be bonded to, the first facing surface 139 of the supporting annulus 136. Opposed first and second retaining flanges 152 and 154 are presented from the first and second annular extension walls 151 and 153, respectively, to engage the second facing surface 140 of the supporting annulus 136.

The wiping lips 155 and 156 are also generally radially oriented and extend obliquely outwardly, and inwardly, from the seal subassembly 135. If desired, the wiping lips 155 and 156 may each include a terminal reinforcing flap 157A and 157B, respectively, which extends in preferably perpendicular relation to the body portion 167A and 167B of the respective lips 155 and 156. The flaps 157A and 157B serve to reinforce the outer edges 177A and 177B of the lips 155 and 156 and thereby assist in maintaining the edges 177A and 177B in contact with the walls of the piston chamber (not shown).

In the alternative embodiment depicted in FIG. 3, the neck portion 146 of each connecting rod 142 is insertably received through a bore 141 in the supporting annulus 136 and the registered bore 158 in the web wall 150 of the seal member 138. The neck portion 146 of each connecting rod 142 may be mechanically "upset", as at 187, to secure the connecting rods 142 to the seal subassembly 135.

Except for the modified arrangement by which the connecting rods 142 are secured to the seal subassembly 135, the resulting piston assembly 110 will function identically to the piston assembly 10.

As should now be apparent, the present invention not only provides a unique seal subassembly for an actuating piston assembly that is particularly suited for use with torque transmitting systems but which also accomplishes the other objects of the invention.

The embodiments of the invention in which an exclusive property or privilege is claimed are defined as follows:

1. A seal subassembly for an actuating piston assembly in a torque transmitting system, said seal sub assembly comprising:
   a substantially planar, metallic supporting annulus having at least one planar facing surface;
   a seal member;
   said seal member having an annular web wall;
   said web wall having a radially outer perimeter and a radially inner boundary;
   said web wall being bonded to said facing surface on said supporting annulus;
   a first wiping lip extending radially outwardly from said radially outer perimeter of said web wall to be disposed, at least in part, radially outwardly with respect to said supporting annulus;
   a second wiping lip extending radially inwardly from said inner boundary of said web wall to be disposed, at least in part, radially inwardly with respect to said supporting annulus; and,
   a plurality of bores spaced circumferentially about said supporting annulus in register with corresponding bores penetrating said web wall of said seal member.

2. A seal subassembly for an actuating piston assembly in a torque transmitting system, said seal subassembly comprising:
   a substantially planar, metallic supporting annulus having first and second planar facing surfaces;
   a seal member;
   said seal member having an annular web wall;

said web wall having a radially outer perimeter and a radially inner boundary;

a first, cylindrically annular extension wall extending axially from said outer perimeter of said annular web wall and terminating in a first retaining flange extending radially inwardly from said first extension wall;

a second, cylindrically annular extension wall extending axially from said radially inner boundary of said annular web wall and terminating in a second retaining flange extending radially outwardly in opposition to said first retaining flange;

said web wall of said seal member engaging said first facing surface of said supporting annulus with said retaining flanges embracing at least a portion of said second facing surface of said supporting annulus;

a wiping lip extending obliquely outwardly from the juncture of said web wall and each said extension wall; and, a plurality of bores spaced circumferentially about said supporting annulus in register with corresponding bores in said web wall of said seal member.

3. An actuating piston assembly for a torque transmitting device, said actuating piston assembly comprising:

a seal subassembly having a supporting annulus and a seal member;

said seal member being bonded to said supporting annulus;

a generally radially oriented first wiping lip extending outwardly with respect to said seal subassembly and a generally radially oriented second wiping lip extending inwardly with respect to said seal subassembly;

a plurality of circumferentially spaced bores penetrating said supporting annulus and said seal member; and, a plurality of dowel-like connecting rods presented from at least selected of said bores.

4. An actuating piston assembly, as set forth in claim 3, wherein:

said supporting annulus is substantially planar and has oppositely directed first and second facing walls;

said seal member being bonded to one of said facing walls.

5. An actuating piston assembly, as set forth in claim 4, wherein said connecting rod further comprises:

a body portion having opposed ends:

a head portion located at one end of said body portion;

a radially extending flange forming a shoulder that is disposed between said body portion and said head portion;

said supporting annulus engaging said shoulder; and, an engaging surface at the other end of said body portion.

6. An actuating piston assembly, as set forth in claim 5, wherein said seal member further comprises:

an annular web wall;

said web wall having a radially outer perimeter and a radially inner boundary;

a first, cylindrically annular extension wall extending axially from said outer perimeter of said annular web wall and terminating in a first retaining flange extending radially inwardly from said first extension wall;

a second, cylindrically annular extension wall extending axially from said radially inner boundary of said annular web wall and terminating in a second retaining flange extending radially outwardly in opposition to said first retaining flange;

said web wall of said seal member engaging said first facing surface of said supporting annulus with said retaining flanges embracing said second facing surface of said supporting annulus;

a wiping lip extending obliquely outwardly from the juncture of said web wall and each said extension wall of said seal member; and, a plurality of bores spaced circumferentially about said supporting annulus in register with corresponding bores in said web wall of said seal member.

* * * * *